US008141220B2

(12) United States Patent
Guardia Aura

(10) Patent No.: US 8,141,220 B2
(45) Date of Patent: Mar. 27, 2012

(54) METHOD FOR UNCOUPLING THE SUPPORT AND REMOVING THE PROTECTIVE FILM FROM LENSES DURING PRODUCTION

(75) Inventor: Jose Guardia Aura, Sabadell (ES)

(73) Assignee: Insomec Integra Soluciones, S.L.L., Barcelona (ES)

( * ) Notice: Subject to any disclaimer, the term of this patent is extended or adjusted under 35 U.S.C. 154(b) by 606 days.

(21) Appl. No.: 12/306,697

(22) PCT Filed: Jun. 28, 2007

(86) PCT No.: PCT/ES2007/000384
§ 371 (c)(1),
(2), (4) Date: Dec. 26, 2008

(87) PCT Pub. No.: WO2008/003805
PCT Pub. Date: Jan. 10, 2008

(65) Prior Publication Data
US 2009/0320262 A1 Dec. 31, 2009

(30) Foreign Application Priority Data
Jul. 6, 2006 (ES) .................................. 200601846

(51) Int. Cl.
B23P 19/02 (2006.01)
(52) U.S. Cl. ..................... 29/426.4; 29/426.1; 29/426.3; 29/791; 451/384; 451/390
(58) Field of Classification Search ................. 29/426.1, 29/426.2, 426.3, 743, 426.4, 791; 269/21; 351/177; 451/390, 384
See application file for complete search history.

(56) References Cited

U.S. PATENT DOCUMENTS
| 2,421,753 | A | | 6/1947 | Joyce |
| 3,962,833 | A | * | 6/1976 | Johnson .......................... 451/42 |
| 4,328,060 | A | | 5/1982 | Tusinski et al. |
| 4,432,380 | A | | 2/1984 | Riuf et al. |

(Continued)

FOREIGN PATENT DOCUMENTS
| EP | 1533074 A | 5/2005 |
| FR | 2475447 A | 8/1981 |
| JP | 11020035 A | 1/1999 |

OTHER PUBLICATIONS

Machine Translation of EP 1533074 (A1) submitted on applicant's IDS submitted Dec. 26, 2008.*

(Continued)

Primary Examiner — David Bryant
Assistant Examiner — Ryan J Walters
(74) Attorney, Agent, or Firm — Sturm & Fix LLP

(57) ABSTRACT

The invention relates to a method for uncoupling the support and removing a protective film from lenses during production. The method consists of: a phase comprising the weakening of the layer (5) of fluxing material, specific to a matching support (4), with the application of a hot fluid in order to soften same; the lateral projection of a jet (7) of pressurized liquid onto the support (4) in order to detach said support; the lateral projection of an orientable pressurized jet (8) onto the edge of the lens (1) in order to raise the protective sheet (3) to be found on the front face of the lens and to detach same fully from the lens; and the draining of the lens (1) in order for same to be delivered to an outlet tray.

4 Claims, 1 Drawing Sheet

U.S. PATENT DOCUMENTS

| | | | |
|---|---|---|---|
| 5,607,518 A | 3/1997 | Hoffman et al. | |
| 7,252,100 B1 * | 8/2007 | Downes et al. | 134/111 |
| 7,578,725 B2 * | 8/2009 | Igarashi et al. | 451/41 |
| 7,935,402 B2 * | 5/2011 | Cole et al. | 428/40.1 |
| 2001/0004282 A1 * | 6/2001 | Carey et al. | 351/245 |
| 2008/0051017 A1 * | 2/2008 | Jiang et al. | 451/384 |

OTHER PUBLICATIONS

Machine Translation of FR 2475447 (A1) submitted on applicant's IDS submitted Dec. 26, 2008.*

International Search Report.

* cited by examiner

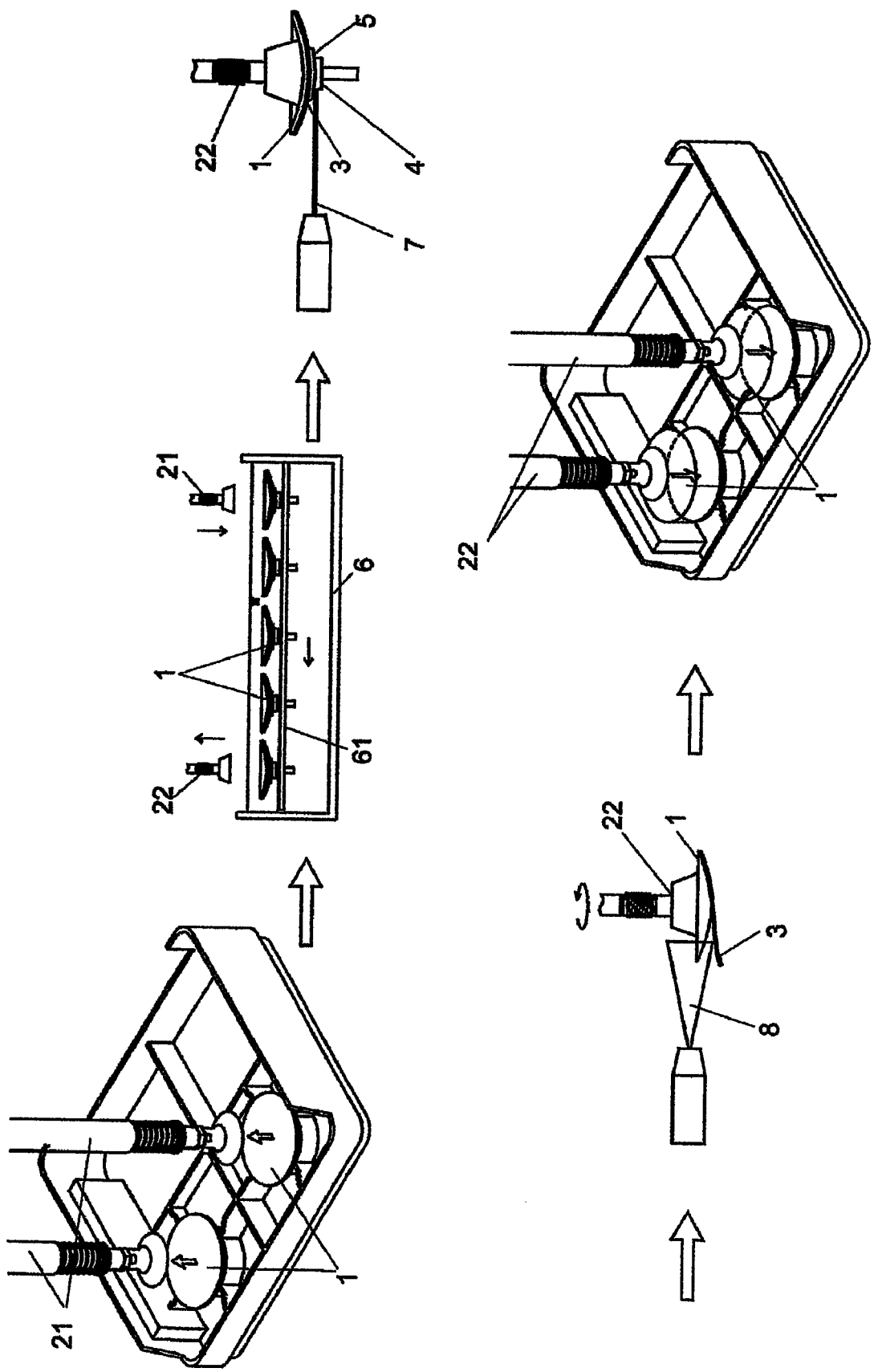

METHOD FOR UNCOUPLING THE SUPPORT AND REMOVING THE PROTECTIVE FILM FROM LENSES DURING PRODUCTION

BACKGROUND OF THE INVENTION

1. Field of the Invention

This invention relates to a procedure for the unblocking and the removal of the protection film of a lens during its manufacturing process

2. Description of the Related Art

The manufacturing process of lenses aimed for glasses and optics in general includes the machining and polishing of a block or crystal or an optical material and subsequently a surface treatment through the application of chemical coatings among some other steps.

In this machining procedure, the block of crystal or the optical material have a protection layer on its front side in order to avoid any fortuitous scratching, involving the machining of the back side of a block of crystal and the cutting of the contour according with the shape of the attachment rim required by the glasses.

In order to hold firmly the block of crystal during the machining process, a support is adhered to the said block of crystal using an alloy layer or a low temperature melting material having a great surface tension that is the responsible for the adhesion.

This joining together the support and the block of crystal is carried out on the side where the protection plastic film is located. The support may be suitable for fitting using an intermediate duct in the crystal machining machine.

Once the lens has been machined from the block, the support and the protection film must be removed in order to proceed to carry out the surface chemical treatments and finishing process. For this, the support is removed by a knock or impact to weaken the surface tension that holds the melting alloy. This process implies a high risk of breaking the fragile machined lens thus a high rejection of material can happen due to deterioration.

Besides, to remove the protection layer, a blade or similar element is used to scrape the contour of the lens in order to lift the protection film and achieve a safe removal. This is a trick operation because during the machining and cutting processes of the lens, the film is adjusted to the contour of the said lens thus the process of scratching and lifting the protection film can cause small scratches and damages in the edge of the lens thus altering its quality. Besides, this operation must be performed manually.

This operation of unblocking the support and removing the protection film is usually carried out for a set of two lenses because the most common way is to carry out the machining with a two-lense set required for one pair of glasses.

DESCRIPTION OF THE INVENTION

In this invention, the operations of unblocking the support and removing the protection film from the lens during the manufacturing process have some features that allow the performance of said operations without virtually any risk of damaging the lens.

Effectively the procedure includes the following steps:

the weakening of the layer of melting material by means of the application of a hot fluid on the lens and support set in order to cause the softening of said melting material layer set between the protection film and the lower support. Once weakened, this layer makes easier the soft removal of the support thus avoiding any possible damage to the lens;

a lateral projection of a pressurized jet of liquid on the support in order to cause its detachment taking advantage of the fluent state of the melting material layer, now liquid with unstable subjection. The support is withdrawn for a later usage in the machining of other lenses;

a lateral projection of a jet of pressurized liquid provided with variable leaning pressure over the lens in order to cause the lifting of the protection layer border thanks to the penetration of a pressurized liquid between the film and the lens in a way such as said lifting raises until the complete detachment of the protection layer and its removal are obtained. Once the jet of liquid has started penetrating between the lens and the film, the said film loses its adhesion properties while this taking apart makes easier the penetration of the jet in a more efficient way and with a higher pressure until the detachment is obtained.

the drainage of the lens before its delivery to an outlet tray. This drainage process can a simple reversal of the lens thus the fluid accumulated into the concavity fells down due to gravity.

The phase of weakening and softening of the melting material that fastens the lens to the lower support is obtained preferably by dipping the set into a hot or warm liquid bath duly heated thus the set may reach the temperature at which the melting material gets into fluency or liquid state.

Thus, for instance, the aforementioned bath may be carried out in a tank of reusable hot water to cause the detachment and the removal of the support and the protection film thus the liquid may be recovered for later use.

In an alternative embodiment of this invention, the softening phase may be carried out through the implementation of the continuous projection of a warm or hot fluid jet that can be saved for later usage. This fluid projected may be hot air.

The liquid or fluid used in the weakening and softening phase has preferably a temperature between 50° C. and 65° C., approximately the temperature at which the melting material starts loosing its solid consistency while being sufficiently fluid to endure manipulation as a liquid.

The implementation of the variable jet to detach the film is made possible by a helical projection from the rotating nozzle of an injector. The efficacy of the said variable jet is based on the fact that the movement of the jet falls on the edge that separates the film of the lens thus causing subsequently the inlet of liquid until the penetration of the aforementioned jet begins to cause the complete detachment of the film. During the application of the variable jet, the lens turns around its longitudinal axe in order to fit the application of the variable jet over the entire contour of the said lens.

DESCRIPTION OF THE DRAWINGS

In order to round off this description and with the aim of making easier the understanding of the features of this invention, enclosed to this descriptive report is a set of graphics which illustrative and non-restricting nature stands for the following:

FIG. 1 shows an illustration displaying diagrammatically the subsequent steps or phases of the procedure.

DETAILED DESCRIPTION OF THE PREFERRED EMBODIMENT

As may be noticed in the referenced figures, the procedure includes the receipt of the lenses (1) by couples on a tray for the machining unit. Using two arms (21) equipped with pneumatic vacuum suction pads, the set of lenses by pairs (1) is removed. Each set of lens (1) is formed by the lens (1) in a reversed position thus having on its front face a protection plastic film (3) and on this film (3), the machining support (4) and the anchoring conduct. This solid attachment of the support (4) to the protection film (3) is carried out using a layer (5) of material or melting alloy.

The arms (21) lay both set of lens and support (1, 3, 4, 5) in an immersion tank (6). This immersion tank (6) includes a bath of warmed fluid-preferably water-, between 50° C. and 65° C. and a transport system (61) of the lens and supports (1, 3, 4, 5) sets thus to proceed to its weakening and softening until the fluency of the layer (5) of melting material is obtained by warming.

The edge of the tank (6) is equipped with two arms (22) provided with pneumatic suction pads aimed to the removal of the couple sets (1, 3, 4, 5) from the bath and the positioning of every set (1, 3, 4, 5) in front of the lateral projection of a jet of liquid (7) or fluid on the support (4) in order to cause the detachment of said support (4) due to the fact that the layer (5) of melting material can not stand the pressure of lateral thrust. The liquid projected by this jet (7) may be preferably water the tank (6) in order to recollect and reuse it later.

Next to the detachment of the support (4) is carried out a lateral projection of a pressurized jet of liquid (8) with variable leaning and preferably of helical type, impacting said jet projection (8) against the lateral area of the lens (1) aimed to cause the lifting of the edge of the protection film (3) in the front side of the lens (1) until the complete detachment of said film (3) is obtained. While this lateral projection of the jet (8) occurs, the turning of the lens (1) is obtained by means of the axial rotation of the arms (22).

Once the protection film (3) and the support (4) of the lens have been removed, said arms (22) are turned in order to carry out the draining of the lens (1) for its delivery to an outlet tray.

The nature and a preferred embodiment of this invention have been explained above with reference to the aforementioned embodiment. However, it is clear that the materials, shape, size and arrangement of the disclosed elements may be modified but only if no alteration is caused on the essential features of the invention, which claims are listed below.

The invention claimed is:

1. A process for uncoupling a support and for removal of a protection film placed on lenses during manufacturing thereof, and subsequently to machining and polishing said lenses, each lens supplied with the protective layer on a front side where a machining support is assembled thereto using a layer of melted material, the process comprising:

softening of the layer of melted material by applying a warmed fluid to a set of the lenses and to the support;

projecting a pressurized lateral jet of warmed fluid onto the support to cause detachment and separation of the support from each lens;

variably projecting a pressurized lateral jet of warmed fluid at a variable orientation, for acting on a contour of each lens by rotating the lenses around a longitudinal axis thereof for applying the variable orientation jet onto the entire contour of said lenses, in order to cause the protective layer to lift and progressively separate from a contour of the lens until there is a complete removal of the protective layer from the lenses; and, draining the warmed fluid from the lenses.

2. The process according with claim 1 wherein the softening is carried out by immersing the lenses and supports into a bath of warmed fluid.

3. The process according to claim 1 wherein the softening is carried out by applying a jet or projection of a warm fluid onto the set of lenses.

4. The process according to claim 1 wherein a temperature of the warmed fluid used for softening is between 50° C. and 65° C.

\* \* \* \* \*